(12) United States Patent
Lindenman et al.

(10) Patent No.: US 6,685,210 B2
(45) Date of Patent: Feb. 3, 2004

(54) ADJUSTABLE FIFTH WHEEL HITCH WITH ROLLERS

(75) Inventors: Thomas W. Lindenman, South Bend, IN (US); Richard W. McCoy, Granger, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

(21) Appl. No.: 10/222,522

(22) Filed: Aug. 16, 2002

(65) Prior Publication Data

US 2003/0034631 A1 Feb. 20, 2003

Related U.S. Application Data

(60) Provisional application No. 60/313,299, filed on Aug. 17, 2001.

(51) Int. Cl.$^7$ ................................................ B62D 53/06
(52) U.S. Cl. ..................................... 280/441; 280/438.1
(58) Field of Search ........................... 280/438.1, 441, 280/441.1, 901

(56) References Cited

U.S. PATENT DOCUMENTS

| | | |
|---|---|---|
| 2,680,627 A | 6/1954 | Johnson et al. |
| 2,799,516 A | 7/1957 | Greenway |
| 2,819,096 A | 1/1958 | Sencenich |
| 2,860,891 A | 11/1958 | Ramun |
| 2,900,194 A | 8/1959 | Lay |
| 2,985,463 A | 5/1961 | Geerds |
| 3,112,936 A | 12/1963 | Cole et al. |
| 3,170,716 A | 2/1965 | Walther et al. |
| 3,402,944 A | 9/1968 | Day |
| 3,584,899 A | 6/1971 | Gottler et al. |
| 3,606,384 A | 9/1971 | Fontaine et al. |
| 3,746,369 A | 7/1973 | Neff et al. |
| 3,861,709 A | 1/1975 | Mulcahy et al. |
| 3,893,710 A | 7/1975 | Madura |
| 4,029,335 A | 6/1977 | Cady et al. |
| 4,134,601 A | 1/1979 | Propst |
| 4,429,892 A | 2/1984 | Frampton et al. |
| 4,505,344 A | 3/1985 | Hobbs et al. |
| 4,614,355 A | 9/1986 | Koch |
| 4,856,804 A | 8/1989 | Nash |
| 5,449,191 A | 9/1995 | Cattau |
| 5,509,682 A | 4/1996 | Lindenman et al. |
| 5,516,137 A | 5/1996 | Kass et al. |
| 5,529,329 A | 6/1996 | McCoy |
| 5,707,070 A | 1/1998 | Lindenman et al. |
| 5,772,229 A | 6/1998 | Cattau |
| 5,839,745 A | 11/1998 | Cattau et al. |
| 6,247,720 B1 | 6/2001 | Linger et al. |
| 6,357,777 B1 | 3/2002 | Linger et al. |
| 6,386,570 B2 | 5/2002 | Linger et al. |
| 6,557,883 B2 * | 5/2003 | Linger et al. ............... 280/441 |

* cited by examiner

Primary Examiner—Lesley D. Morris
Assistant Examiner—Matt Luby
(74) Attorney, Agent, or Firm—King & Schickli, PLLC

(57) ABSTRACT

An adjustable fifth wheel hitch includes a support frame having base rails that are secured to the frame of a vehicle and a pair of spaced guide rails that bridge between the base rails. The fifth wheel hitch also includes a head assembly having a jaw assembly for engaging a king pin on a trailer. A head support includes a pair of uprights having sets of rollers for mounting the head assembly for relative fore-and-aft sliding movement along the guide rails between the towing position and a maneuvering position. A releasable lock secures the head assembly in either selected position.

14 Claims, 6 Drawing Sheets

ADJUSTABLE FIFTH WHEEL HITCH WITH ROLLERS

This application claims the benefit of U.S. Provisional Patent Application Serial No. 60/313,299 filed on Aug. 17, 2001.

TECHNICAL FIELD

The present invention relates generally to the trailer towing field and, more particularly, to an improved fifth wheel hitch that is adjustable to conveniently allow enhanced maneuverability in limited or tight operating areas when required.

BACKGROUND OF THE INVENTION

Fifth wheel hitches for towing a trailer behind a towing vehicle have long been known in the art. Examples of state-of-the-art fifth wheel hitches include those presently manufactured by Reese Products, Inc. of Elkhart, Ind. under U.S. Pat. No. 5,707,070.

These state-of-the-art fifth wheel hitches include a support frame having base rails that are secured to the bed and/or frame of the towing vehicle and a pair of spaced guide rails that bridge between the base rails. These fifth wheel hitches also include a head assembly having a jaw assembly for engaging a king pin on a trailer. A head support and a pair of uprights mount the head assembly for relative fore-and-aft sliding movement along the guide rails between a towing position and a maneuvering position. Load bearing shoes formed from nylon, polytetrafluoroethylene or other known low friction material are provided in each upright to slide over the surface of the guide rails and allow smooth movement of the head assembly. A releasable lock secures the head assembly in either selected position.

While such state-of-the-art fifth wheel hitches provide excellent overall performance and dependable operation, it is believed that further design improvements are still possible.

SUMMARY OF THE INVENTION

In accordance with the purposes of the present invention as described herein, an adjustable fifth wheel hitch is provided for towing a trailer behind a motor vehicle. The adjustable fifth wheel hitch includes a support frame having a first guide rail, a head assembly including a first upright and a jaw assembly for engaging the king pin of a trailer. A first set of three rollers is held for relative rotation on the first upright. The three rollers ride on the first guide rail so as to allow selective displacement of the head assembly on the support frame between a towing position and a maneuvering position. A lock releasably locks the head assembly in either of the towing and maneuvering positions.

Still further describing the invention, the first upright includes a first end and a second, opposite end. The first end of the upright and the guide rail upon which the upright rides form an obtuse angle of between substantially 91–140° and more typically about 122°. The second end and the guide rail form an angle of between about 75–89° (typically about 80°). Still further, the first set of three rollers includes one roller adjacent the first end of the upright and two rollers adjacent the second end of the upright.

In accordance with an additional aspect of the present invention the adjustable fifth wheel hitch may be described as comprising a support frame including a first guide rail, a second guide rail and a head assembly including a first upright, a second upright and a jaw assembly. A first set of three rollers is held for relative rotation on the first upright. The first set of three rollers rides on the first guide rail. A second set of three rollers is held for relative rotation on the second upright. That second set of three rollers rides on the second guide rail. Together the first and second sets of three rollers allow selective displacement of the head assembly on the support frame between a towing position and a maneuvering position. A lock is provided for releasably locking the head assembly in either of these two positions as desired.

Still other aspects and features of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
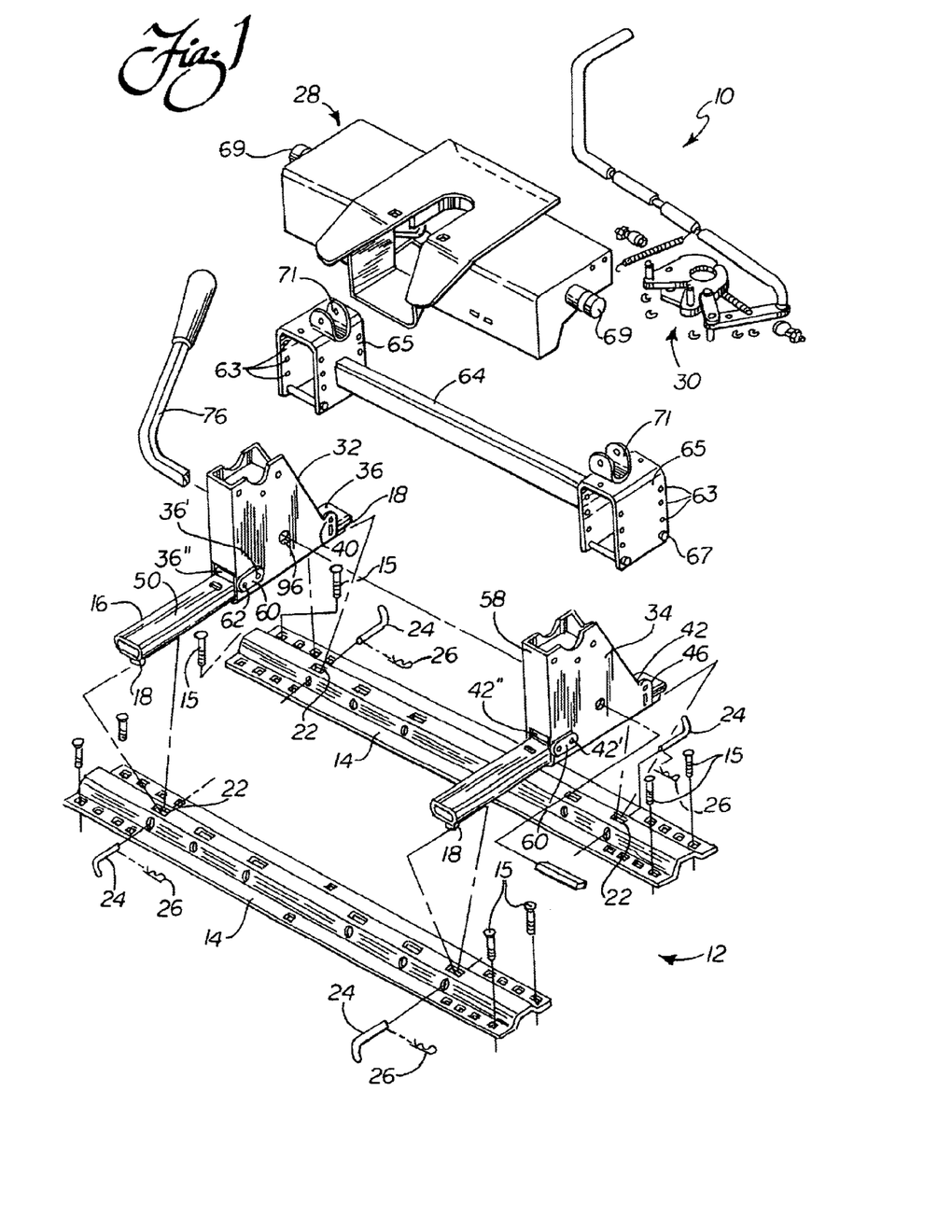
FIG. 1 is an exploded perspective view of the fifth wheel hitch of the present invention for towing a trailer behind a motor vehicle.

Reference is now made to FIG. 1 showing the fifth wheel hitch of the present invention. The hitch 10 includes a support frame, generally designated by reference numeral 12, comprising a pair of spaced parallel base rails 14 of conventional design. These base rails 14 are bolted (note bolts 15) or otherwise fastened to the frame of the motor vehicle, such as a pickup truck, in a manner well known in the art. Additionally, the support frame 12 includes a pair of spaced guide rails 16 that are mounted so as to bridge between the transversely extending base rails 14 and thereby extend parallel to the longitudinal axis of the motor vehicle. More particularly, each guide rail 16 is formed from a four-sided tube constructed from steel or other appropriate high strength material. A downwardly depending mounting tab 18 may be welded, fixed with bolts or mounted in some other manner at each end of the guide rails 16. Each mounting tab 18 is adapted for receipt in a matching slot 22 formed in the base rails 14. A connecting pin 24 may be passed through aligned cooperating apertures in each of the base rails 14 and tabs 18. A pin clip or other means 26 may then be utilized to secure each connecting pin 24 and, therefore, the guide rails 16 in position.

As is known in the art, the fifth wheel hitch 10 also includes a head assembly generally designed by reference numeral 28. The head assembly 28 carries a jaw assembly, generally designated by reference numeral 30, for releasably engaging the king pin of a trailer to be towed by the motor vehicle equipped with the hitch 10. Such jaw assemblies 30 are well known in the art. One such jaw assembly 30 that may be utilized is disclosed in U.S. Pat. No. 5,516,137 to Kass et al. also owned by the assignee of the present invention. The disclosure in this patent is fully incorporated herein by reference. It should be appreciated, however, that jaw assemblies of other design may also be incorporated into the present invention.

The head assembly 28 also includes first and second side brackets or uprights 32, 34. One upright 32, 34 is mounted for sliding movement along each guide rail 16. As should be appreciated, the first upright 32 includes a first set of three rollers 36, 36', 36" (see also FIGS. 2, 3, 4 and 5). Each of the rollers 36, 36', 36" is mounted for relative rotation in the first upright 32. More specifically, each of the substantially cylindrical rollers 36, 36', 36" includes a shoulder 38 adjacent each end thereof. The portion 37 of each roller 36, 36', 36" projecting outwardly from beyond the shoulder 38 is captured in an aperture 40 in opposing side walls of the first upright 32 (see FIG. 5 illustration).

Similarly, a second set of three rollers 42, 42', 42" is held for relative rotation on the second upright 34. The rollers 42, 42', 42" also include a shoulder at each end. The portion of the rollers 42, 42', 42" projecting beyond the shoulder are captured in cooperating apertures 46 in opposing side walls of the second upright 34.

The faces 48 of the first set of rollers 36, 36', 36" engage, roll over and follow the upper wall 50 of a first of the guide rails 16, while the faces of the second rollers 42, 42', 42" engage, roll over and follow the upper wall 54 of a second of the base rails 16. Together, the rollers 36, 36', 36" and 42, 42', 42" allow smooth, selective displacement of the head assembly 28 between a towing position for properly distributing the weight of the trailer for high speed over-the-road towing and a maneuvering position for providing added clearance between the body work of the motor vehicle and the trailer. This added clearance provides the necessary space to allow the operator to negotiate tight corners without the trailer interfering with and engaging the body work. Hence, greater maneuverability is provided for vehicle operation in confined areas such as are often encountered in parking lots, trailer parks, campgrounds and the like.

Figure 2:
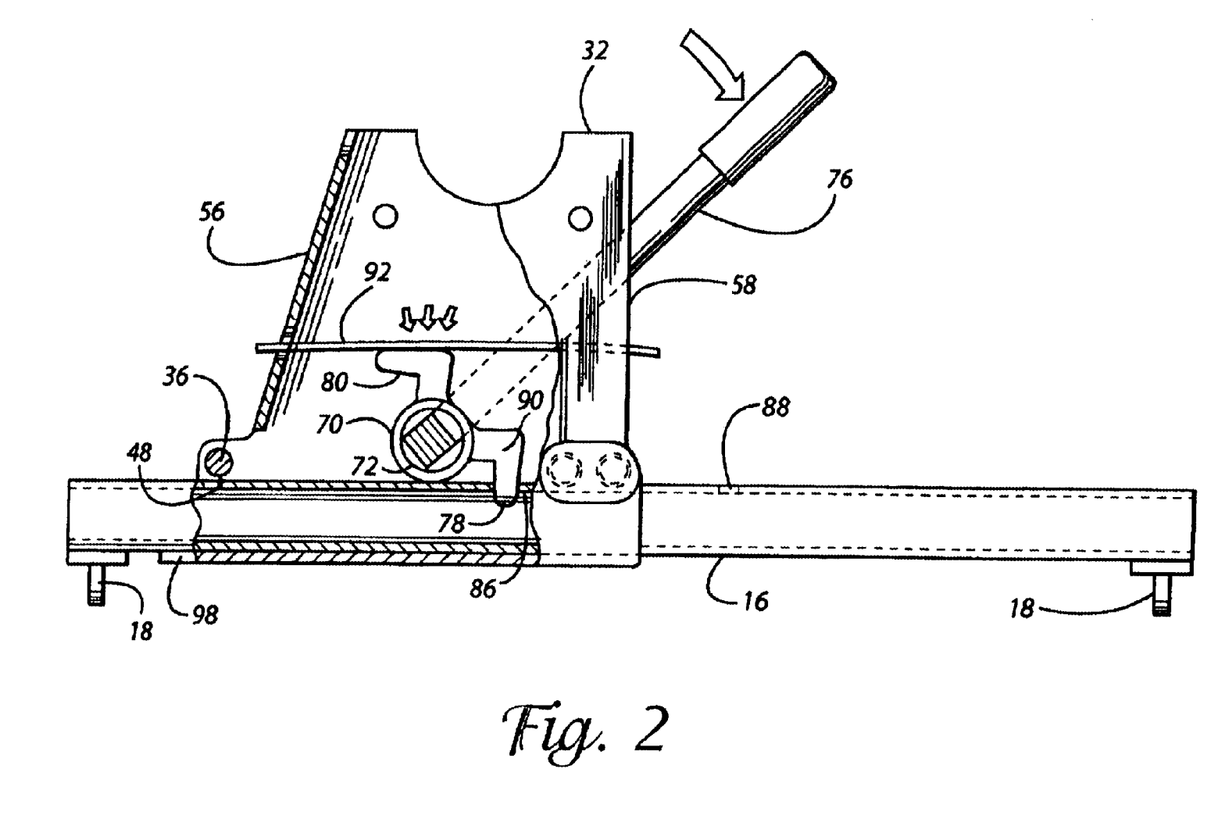
FIG. 2 is a side elevational and partially cross-sectional view showing the hitch of FIG. 1 in the towing position with the head support and head assembly removed.
Figure 3:
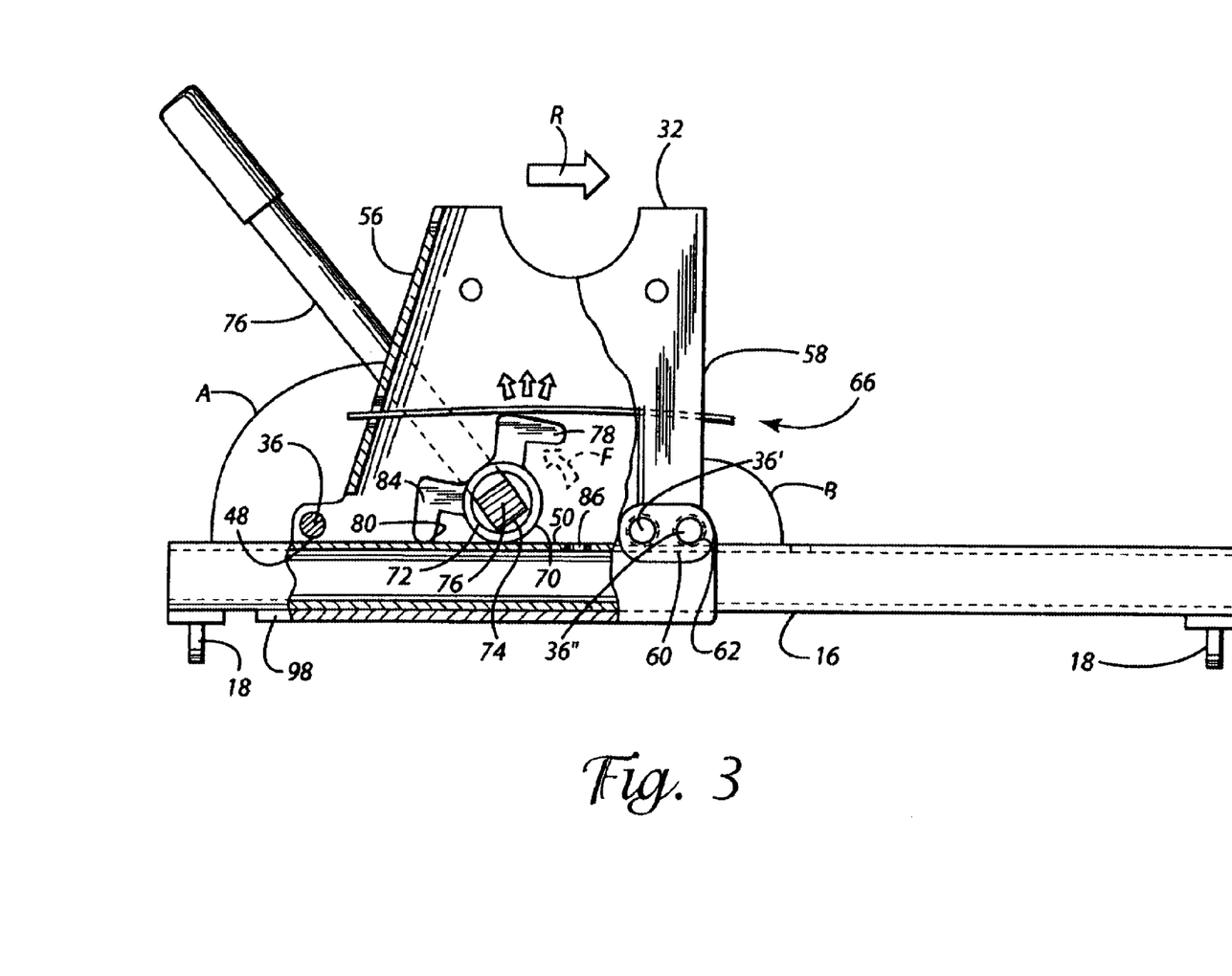
FIG. 3 is a view similar to FIG. 2 but showing the dual bar latch pivoted or flipped to allow sliding movement of the head assembly of the hitch to the maneuvering position.

As should be appreciated from reviewing drawing FIGS. 2 and 3, the first and second uprights 32, 34 each include a first end or front wall 56 and an opposing second end or rear wall 58. The first end 56 is angled from bottom to top toward the second end 58 thereby forming an obtuse angle A with the guide rail 16 upon which the upright 32, 34 rests. This angle is between 91–140° and more typically is about 122°. The second end 58 of each upright 32, 34 forms an angle B of between about 75–89° (typically about 80°) with the guide rail 16 upon which it rests. This angular orientation of the end walls 56, 58 creates an aesthetically pleasing and aerodynamic appearance when viewed from the side. The angular orientation of the first and second ends 56, 58 also results in a greater distribution of the trailer weight toward the second end 58. This is the reason that only one roller 36, 42 is provided in the respective uprights 32, 34 adjacent the first end wall 56 while two rollers 36', 36" and 42', 42" are provided in the respective first and second uprights adjacent the second end wall 58. A reinforcing plate 60 may be welded or otherwise secured to each of the opposed side walls of the first and second uprights 32, 34 to reinforce and strengthen the side walls in the area of the rollers 36', 36" and 42', 42". Each of the reinforcing plates 60 may also include an aperture 62 for receiving and holding the projecting mounting ends of the rollers 36', 36", 42', 42" if desired.

The head assembly 28 also includes a cross member or head support 64 of a type known in the art to bridge between and interconnect the uprights 32, 34. Preferably, the head support 64 includes a U-shaped mounting bracket 65 at each end. Each mounting bracket 65 includes a series of vertically spaced apertures 63 that receive mounting pins or bolts 67 that allow height adjustment to enhance the versatility of the hitch 10 in interconnecting motor vehicles and trailers of various height dimensions. As is further known in the art, the head assembly 28 is pivotally mounted to the head support 64 (note pivot pins 69 and cooperating cradles 71). This pivotal connection may be accomplished by means well known in the art including but not limited to that disclosed in U.S. Pat. Nos. 5,509,682 to Lindenman et al. and 5,529,329 to McCoy, also both owned by the assignee of the present invention. The disclosure in both of these patents is fully incorporated herein by reference.

Figure 4:
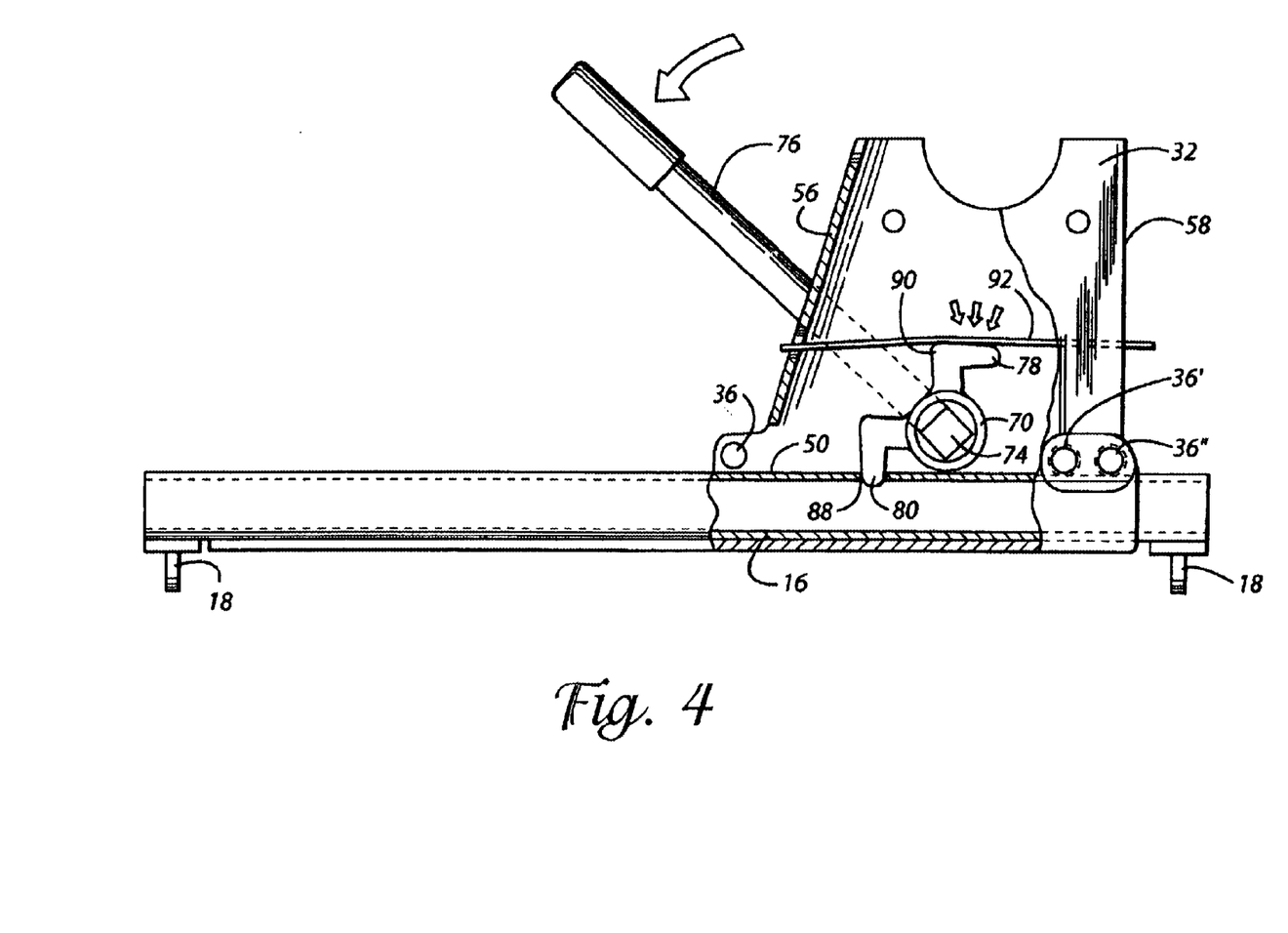
FIG. 4 is a view similar to FIGS. 2 and 3 but showing the hitch locked in the maneuvering position.
Figure 5:
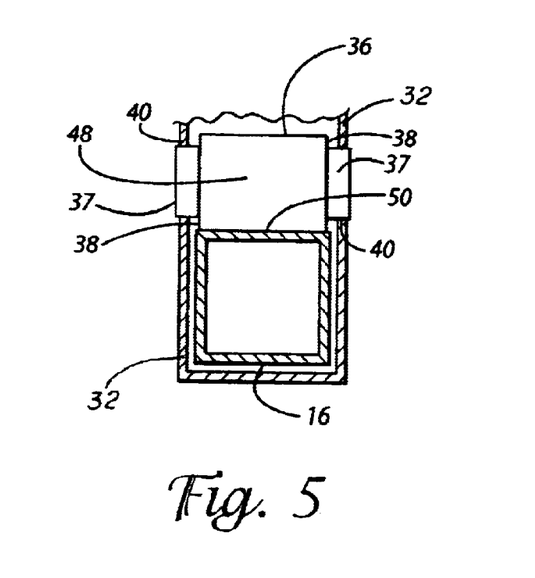
FIG. 5 is a detailed, partially sectional view showing the mounting of one roller in one upright.

As should further be appreciated, the hitch 10 includes a means, generally designated by reference numeral 66 for releasably locking the head assembly 28 in the towing and maneuvering positions (see FIGS. 2, 3 and 4 respectively). The locking means 66 comprises at least one dual bar latch 68. More preferably, two dual bar latches 68 are provided, one pivotally mounted within an internal cavity formed in each upright 32, 34.

Each dual bar latch 68 includes a hub 70 comprising a mounting trunion 72 about which the dual bar latch 68 is pivoted and a square through-hole 74 for receiving a square cross-sectioned control handle 76. Additionally, each latch 68 includes a pair of outwardly projecting bars 78, 80. Preferably the bars 78, 80 are substantially L-shaped. The proximal legs 82 of the bars 78, 80 engage the hub 70 and define an included angle therebetween of approximately 30°. The distal legs 84 of each bar 78, 80 include a tip adapted for receipt in one of two cooperating locking apertures 86, 88 formed in the upper walls 50, 54 of the guide rails 16. A smoothly curved, arcuate surface 90 defines the outer surface of the intersection of the proximal and distal legs 82, 84.

Figure 2A:
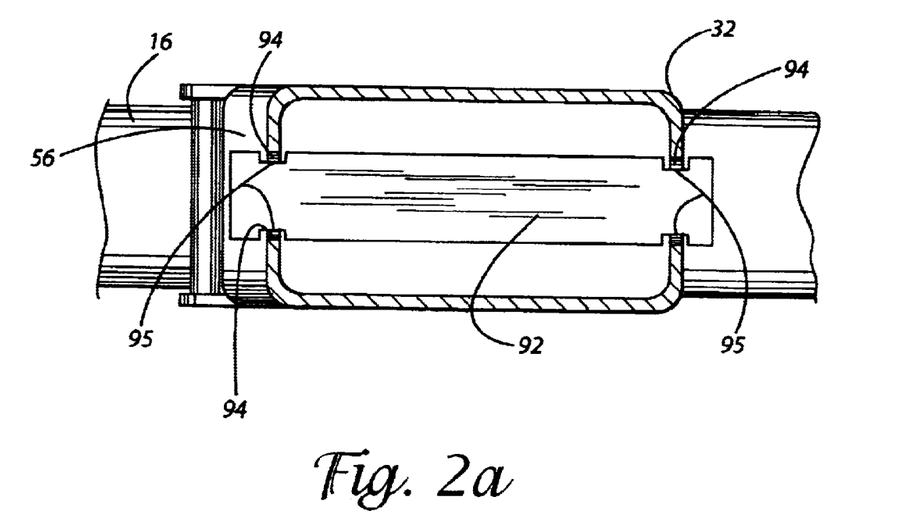
FIG. 2a is a partially sectional detail showing the mounting of the leaf spring in an upright.

The locking means 66 also includes a biasing means in the form of a leaf spring 92. As shown, like the dual bar latch 68, one leaf spring 92 is secured in the cavity formed in each upright 32, 34. More specifically, it should be appreciated that the uprights 32, 34 are formed from two half sections. The front and rear walls of the two half sections include aligned, cooperating slots 94 that secure the notched distal ends of the leaf spring 92 so that the leaf spring is held in a position bridging across the cavity overlying each dual bar latch 68 (see FIG. 2a). Aligned cooperating apertures 96 in the side walls of the two half sections of the uprights 32, 34 are sized to receive the trunion 72 so as to allow pivotal movement of the dual bar latch 68 received therebetween.

During construction, one side of the trunion 72 of the dual bar latch 68 is positioned in the aperture 96 of one of the half sections of the uprights 32, 34. At the same time, a leaf spring 92 is positioned so that the distal ends thereof fit in the slots 94 in that same half section of the uprights 32, 34. The projecting, mounting portions 37 of the rollers 36, 36', 36" or 42, 42', 42" are also positioned in the cooperating apertures 40 or 46 in that same half section. The other half section is then positioned against the first half section so that the opposite end of the trunion 72 is received in the aperture 96 in that half section, the notched ends 95 of the leaf springs 92 are likewise received in the slots 94 of that half section and the projecting mounting portions 37 of the rollers 36, 36', 36" or 42, 42', 42" are received in the cooperating apertures 40 or 46 of that half section. The two half sections of the upright 32 or 34 are then welded or otherwise secured together thereby capturing the leaf spring 92, dual bar latch 68 and rollers 36, 36', 36" or 42, 42', 42" in position (see FIGS. 2a and 5).

The operation of the hitch 10 will now be described in detail. As shown in FIG. 2, the hitch 10 is in the towing position. More specifically, the head assembly 28 is positioned toward the front end of the hitch 10 toward the left of the figure where the weight of the trailer is better distributed for stable, over-the-road towing at road speeds. In this position, the uprights 32, 34 each engage a stop 98 that may be secured to or integrally formed on the guide rails 16. Additionally, the first or rearwardly projecting bar 78 of each latch 68 is received in the first or forward locking aperture 86 in the adjacent guide rail 16. It should be appreciated, the arcuate surface 90 on the second or forwardly disposed bar 80 engages the leaf spring 92 "over-center" so that the first bar 78 is reliably secured and biased into engagement in the locking aperture 86. Thus, it should be appreciated that the head assembly 28 is reliably secured in the towing position.

Upon reaching the desired destination, low speed maneuver-ability may become a more desired operating characteristic than high speed towing stability. As pointed out above, in order to allow sharper cornering the clearance between the trailer and the body work of the motor vehicle must be increased. This may be done by means of a simple process. First the operator stops the motor vehicle. The operator then gets out and manipulates the control handle 76 so as to pivot the dual bar latch 68 in a counterclockwise direction as shown by action arrow F in FIG. 3. As this is done, the arcuate surface 90 on each first or rearwardly projecting bar 78 engages the associated leaf spring 92 over-center. Thus, the leaf spring 92 biases the distal leg 84 of the second or forwardly directed bar 80 downwardly toward the surface of the underlying guide rail 16.

Figure 3A:
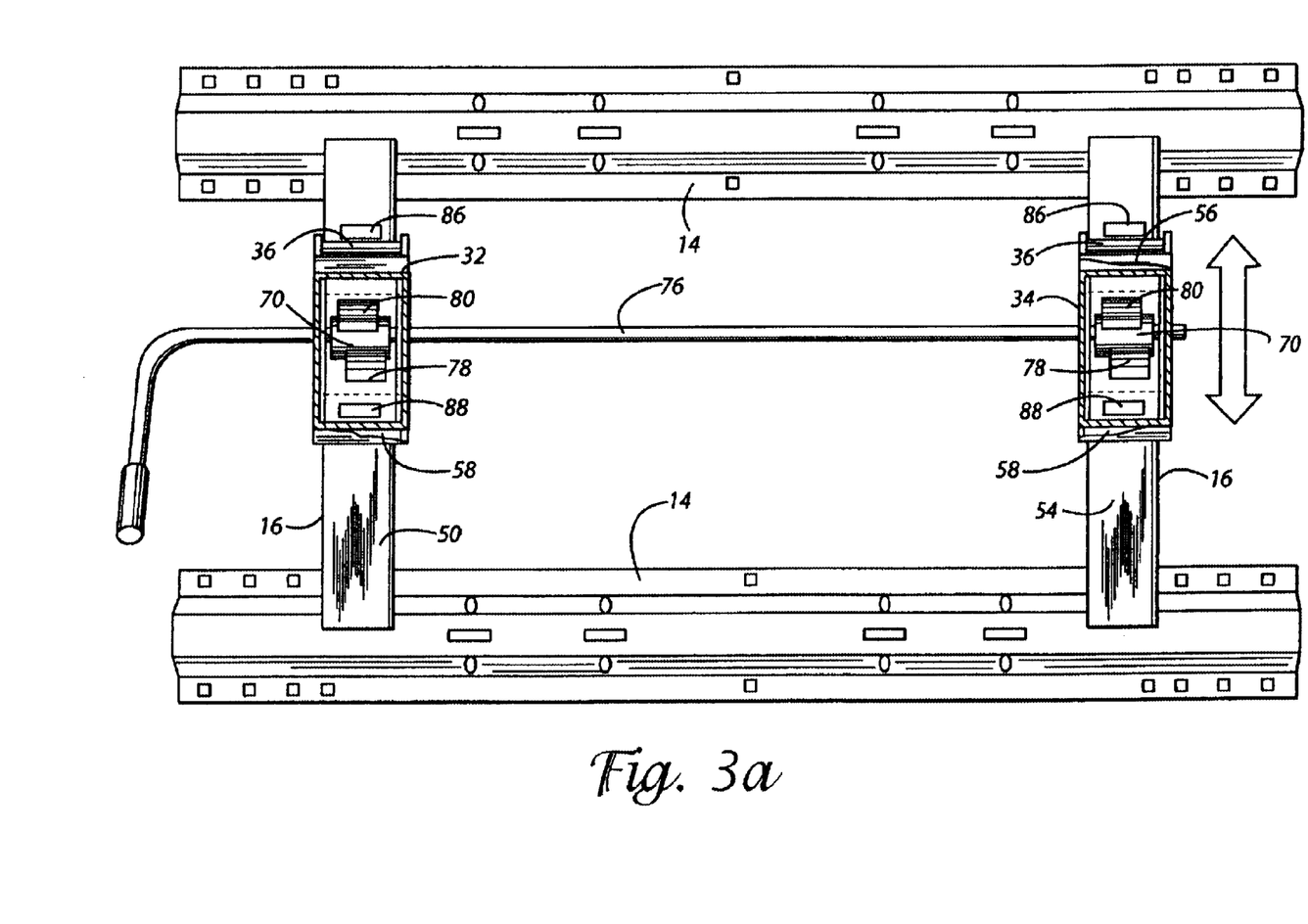
FIG. 3a is a top plan view of the hitch showing the offset of the latch bars and the cooperating apertures in the underlying spaced guide rails (again, the head support and head assembly are removed for clarity)

The operator then gets back into the vehicle and pulls the vehicle forward while engaging the trailer brakes. As a result of this action, the head assembly 28 held on the uprights 32, 34 moves rearwardly (note action arrow R) to the maneuvering position shown in FIG. 4. Smooth, non-binding movement is ensured by the two sets of rollers, 36, 36', 36" and 42, 42', 42". Further, it should be appreciated that each second bar 80 is prevented from engaging the first locking aperture 86. This is because the second bar 80 and the first aperture 86 are offset with respect to the longitudinal centerline underlying the guide rail 16 (note particularly FIG. 3a). Thus, each first bar 78 will only align with and engage in the first cooperating aperture 86 whereas each second bar 80 will only align with and engage in the cooperating second aperture 88.

As the head assembly 28 moves rearwardly, the uprights 32, 34 engage the foot or base of the mounting tabs 18 and substantially simultaneously the tapered tip of the distal leg 84 of each second bar 80 is biased down into the corresponding second locking aperture 88 by the force generated by the associated leaf spring 92. The trailer is then secured in the maneuvering position with a significant increase in clearance of, perhaps, nine inches between the trailer and the body work of the motor vehicle. This added space or clearance allows for sharp cutting so that the operator may negotiate in tight areas where maneuverability is required.

Of course, a similar, simple procedure may be utilized to return the head assembly 28 to the towing position. When the added clearance for utmost maneuverability is no longer required, the operator stops the motor vehicle, gets out and rotates the control handle 76 in a clockwise direction. This pivots the latches 68 causing each forwardly projecting second bar 80 to pivot out of the cooperating second locking aperture 88. The arcuate surface 90 of each second bar 80 is then placed in over-center engagement with the associated leaf spring 92 so that the distal end of each first bar 78 is biased downwardly and into engagement with the upper surface or wall 50, 54 of the underlying guide rail 16. The operator then gets back into the vehicle and backs the vehicle toward the trailer with the trailer brakes engaged. This causes the head assembly 28 held on the uprights 32, 34 to slide forward along the guide rails 16 on the smoothly turning first and second set of rollers 36, 36', 36" and 42, 42', 42". This forward sliding movement continues until the uprights 32, 34 engage the stops 98. Substantially simultaneously the leaf springs 92 bias the tapered ends of the first bars 78 back into the cooperating first locking apertures 86. Of course, the first bars 78 are prevented from hanging up in the second locking apertures 88 because of the offset arrangement described above and shown in FIG. 3a.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An adjustable fifth wheel hitch for towing a trailer behind a motor vehicle, comprising:
   a support frame including a first guide rail;
   a head assembly including a jaw assembly;
   a head support including a first upright;
   a first set of three rollers held for relative rotation on said first upright, said three rollers riding on said first guide rail so as to allow selective displacement of said head assembly on said support frame between a towing position and a maneuvering position; and
   a lock for releasably locking said head assembly in either of said towing and maneuvering positions.

2. The hitch of claim 1, wherein said first upright includes a first end and a second, opposite end, said first end and said guide rail forming an obtuse angle.

3. The hitch of claim 2, wherein said obtuse angle is between 91–140°.

4. The hitch of claim 2, wherein said obtuse angle is about 122°.

5. The hitch of claim 2, wherein said first set of three rollers includes one roller adjacent said first end of said upright and two rollers adjacent said second end of said upright.

6. The hitch of claim 5, wherein said second end and said guide rail form an angle of between about 75–89°.

7. The hitch of claim 5, wherein said second end and said guide rail form an angle of about 80°.

8. An adjustable fifth wheel hitch for towing a trailer behind a motor vehicle, comprising:
- a support frame including a first guide rail and a second guide rail;
- a head assembly including a jaw assembly;
- a head support including first and second uprights;
- a first set of three rollers held for relative rotation on said first upright, said first set of three rollers riding on said first guide rail;
- a second set of three rollers held for relative rotation on said second upright, said second set of three rollers riding on said second guide rail, said first and second sets of three rollers allowing selective displacement of said head assembly on said support frame between a towing position and a maneuvering position; and
- a lock for releasably locking said head assembly in either of said towing and maneuvering positions.

9. The hitch of claim 8, wherein said first and second uprights each include a first end and a second, opposite end, said first end and said guide rail forming an obtuse angle.

10. The hitch of claim 9 wherein said obtuse angle is between 91–140°.

11.) The hitch of claim 9 wherein said obtuse angle is about 122°.

12. The hitch of claim 9 wherein said first and second sets of three rollers each include one roller adjacent said first end and two rollers adjacent said second end.

13. The hitch of claim 12 wherein said second end of said first and second uprights and said first and second guide rails upon which said first and second uprights ride form an included angle of between about 75–89°.

14. The hitch of claim 12, wherein said second end of said first and second uprights and said first and second guide rails upon which said first and second uprights ride form an included angle of about 80°.

* * * * *